(12) United States Patent
Tabassi

(10) Patent No.: US 9,272,455 B2
(45) Date of Patent: Mar. 1, 2016

(54) HOT RUNNER SYSTEM SEALING ARRANGEMENT

(71) Applicant: Mold-Masters (2007) Limited, Georgetown (CA)

(72) Inventor: Payman Tabassi, Rockwood (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

(21) Appl. No.: 14/700,129

(22) Filed: Apr. 29, 2015

(65) Prior Publication Data
US 2015/0314508 A1    Nov. 5, 2015

Related U.S. Application Data

(60) Provisional application No. 61/986,660, filed on Apr. 30, 2014.

(51) Int. Cl.
| | |
|---|---|
| *B29C 45/22* | (2006.01) |
| *B29C 45/74* | (2006.01) |
| *B29L 31/00* | (2006.01) |
| *B29C 45/27* | (2006.01) |

(52) U.S. Cl.
CPC .............. *B29C 45/74* (2013.01); *B29C 45/2725* (2013.01); *B29L 2031/757* (2013.01)

(58) Field of Classification Search
CPC .................................................. B29C 45/2725
USPC .................................................. 425/570, 572
See application file for complete search history.

(56) References Cited

U.S. PATENT DOCUMENTS

| | | |
|---|---|---|
| 3,822,856 A | 7/1974 | Gellert |
| 4,013,393 A | 3/1977 | Gellert |
| 4,026,518 A | 5/1977 | Gellert |
| 4,330,258 A | 5/1982 | Gellert |
| 4,468,191 A | 8/1984 | Gellert |
| 4,576,567 A | 3/1986 | Gellert |
| 4,579,520 A | 4/1986 | Gellert |
| 4,588,367 A | 5/1986 | Schad |
| 4,662,837 A | 5/1987 | Anderson |
| 4,666,396 A | 5/1987 | Shaw |
| 4,669,971 A | 6/1987 | Gellert |

(Continued)

FOREIGN PATENT DOCUMENTS

| | | |
|---|---|---|
| CA | 1 153 523 A | 9/1983 |
| EP | 0 630 733 A1 | 12/1994 |

(Continued)

*Primary Examiner* — Tim Heitbrink
(74) *Attorney, Agent, or Firm* — Medler Ferro PLLC

(57) ABSTRACT

A sealing arrangement between hot runner components includes a sealing component positioned between a first hot runner component and a second hot runner component having a molding material channel extending therebetween. The sealing component includes an opening through which the molding material channel extends. The sealing component is received in a bore in the second hot runner component such that a portion of the sealing component projects beyond the second hot runner component to create a gap between the first hot runner component and the second hot runner component. The sealing component has a hardness that is greater than a hardness of the second hot runner component and less than a hardness of the first hot runner component. Further, the sealing component has a coefficient of thermal expansion that is proximate to a coefficient of thermal expansion of the second hot runner component.

21 Claims, 4 Drawing Sheets

(56) References Cited

U.S. PATENT DOCUMENTS

| | | | | |
|---|---|---|---|---|
| 4,682,945 | A | 7/1987 | Schad | |
| 4,777,348 | A | 10/1988 | Gellert | |
| 5,032,078 | A | 7/1991 | Benenati | |
| 5,125,827 | A | 6/1992 | Gellert | |
| 5,227,179 | A | 7/1993 | Benenati | |
| 5,269,676 | A | 12/1993 | Gellert | |
| 5,478,230 | A | 12/1995 | McGrevy | |
| 5,499,916 | A | 3/1996 | Schad et al. | |
| 5,507,637 | A | 4/1996 | Schad et al. | |
| 5,518,389 | A | 5/1996 | Nonomura et al. | |
| 5,533,882 | A | 7/1996 | Gessner et al. | |
| 5,609,893 | A | 3/1997 | Eastwood | |
| 5,759,595 | A | 6/1998 | Gunther | |
| 5,792,493 | A * | 8/1998 | Gellert | B29C 45/2727 425/572 |
| 5,896,640 | A | 4/1999 | Lazinski | |
| 5,952,016 | A * | 9/1999 | Gellert | B29C 45/2735 425/572 |
| 6,062,846 | A | 5/2000 | Kalemba | |
| 6,261,084 | B1 | 7/2001 | Schmidt | |
| 6,309,207 | B1 | 10/2001 | Kalemba | |
| 6,331,106 | B1 | 12/2001 | Helldin | |
| 6,713,002 | B2 | 3/2004 | Kazmer et al. | |
| 6,860,732 | B2 | 3/2005 | Babin et al. | |
| 7,303,384 | B2 * | 12/2007 | Schreck | B29C 45/2735 425/572 |
| 8,899,961 | B2 * | 12/2014 | Esser | B29C 45/2737 425/572 |
| 8,899,964 | B2 * | 12/2014 | Babin | B29C 45/22 425/572 |
| 8,932,046 | B2 * | 1/2015 | Tabassi | B29C 45/076 425/572 |
| 2001/0011415 | A1 | 8/2001 | Kalemba | |
| 2002/0164392 | A1 * | 11/2002 | Kazmer | B29C 45/27 425/570 |

FOREIGN PATENT DOCUMENTS

| | | |
|---|---|---|
| EP | 0 885 707 A1 | 12/1998 |
| EP | 1 053 852 A1 | 11/2000 |
| WO | 01/81066 A1 | 11/2001 |
| WO | 01/87570 A1 | 11/2001 |
| WO | 01/96089 A1 | 12/2001 |

* cited by examiner

HOT RUNNER SYSTEM SEALING ARRANGEMENT

CROSS-REFERENCE TO RELATED APPLICATION

This application claims the benefit under 35 U.S.C. §119(e) of U.S. provisional application No. 61/986,660 filed Apr. 30, 2014, the contents of which are incorporated by reference herein in their entirety.

FIELD

This disclosure is related to hot runner systems and more specifically to a sealing arrangement between hot runner components.

BACKGROUND

Creating a consistent and reliable seal between the molding material channels of adjacent hot runner components has been a challenge in the industry for many years. To reduce the likelihood of leakage, hot runner manufacturers have tried different sealing components or arrangements between the adjacent hot runner components. For example, high temperature o-ring seals and crush rings have been used; however, these seals are prone to degradation and or collapsing which reduces their overall service life. Often the seal between the adjacent hot runner components is dependent upon the system being heated to within a specific processing temperature range for the seal to be effective. If the system temperature is too low it is probable that the leakage will occur from between the adjacent components. However, if the system is overheated it is also probable that the seal itself will become compromised and its overall effectiveness will be reduced and/or the seal will expand and push the adjacent components apart, which reduces heat transfer therebetween. Such seals are also dependent upon the melt flow index and/or the viscosity of the material being processed in order to prove effective. Accordingly, there has long been a need in the art to provide a predictable reliable seal between adjacent hot runner components that is effective across a range of processing temperatures and for a variety of molding materials.

SUMMARY

Embodiments hereof are directed to a sealing arrangement for a hot runner molding system. The hot runner molding system includes a first hot runner component and a second hot runner component having a molding material channel extending therebetween. A sealing component is positioned between the first hot runner component and the second hot runner component, and includes an opening through which the molding material channel extends. The sealing component is received in a bore in the second hot runner component such that a portion of the sealing component projects beyond the second hot runner component to create a gap between the first hot runner component and the second hot runner component. The sealing component has a hardness that is greater than a hardness of the second hot runner component and less than a hardness of the first hot runner component. Further, the sealing component has a coefficient of thermal expansion that is proximate to a coefficient of thermal expansion of the second hot runner component.

Embodiments hereof are also directed to a sealing arrangement for a hot runner system. The hot runner system includes an actively heated first hot runner component having a first portion of a molding material channel, a passively heated second hot runner component having a bore and a second portion of the molding material channel in communication with the first portion, and a sealing component positioned in the bore and positioned between the first hot runner component and the second hot runner component. The sealing component includes an opening through which the molding material channel extends. The sealing component has a hardness that is greater than a hardness of the second hot runner component and less than a hardness of the first hot runner component. The sealing component has a coefficient of thermal expansion that is proximate to a coefficient of thermal expansion of the second hot runner component.

Embodiments hereof are also directed to a sealing arrangement for a hot runner system. The hot runner system includes an actively heated first hot runner component having a first portion of a molding material channel, a passively heated second hot runner component having a bore and a second portion of the molding material channel in communication with the first portion, and a sealing component positioned in the bore and positioned between the first hot runner component and the second hot runner component. The sealing component includes an opening through which the molding material channel extends. The second hot runner component has a thermal conductivity that is greater than a thermal conductivity of the first hot runner component. The sealing component has a coefficient of thermal expansion that is proximate to a coefficient of thermal expansion of the second hot runner component.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION

Specific embodiments are now described with reference to the figures. The following detailed description is merely exemplary in nature and is not intended to limit the invention or the application and uses of the invention. In the following description, "downstream" is used with reference to the direction of mold material flow from an injection unit to a mold cavity of an injection molding system and also to the order of components, or features thereof, through which the molding material flows from an injection unit to a mold cavity, whereas "upstream" is used with reference to the opposite direction. In the following detailed description "forward" is used as reference direction meaning towards the parting line PL of the injection molding system, whereas "rearward" is used as a reference direction meaning away from the parting line. Although the description of embodiments hereof are in the context of side gating and micro molding hot runner systems, the invention may also be used in other molding arrangements where it is deemed useful. Furthermore, there is no intention to be bound by any expressed or implied theory presented in the preceding technical field, background, brief summary or the following detailed description.

Figure 1:
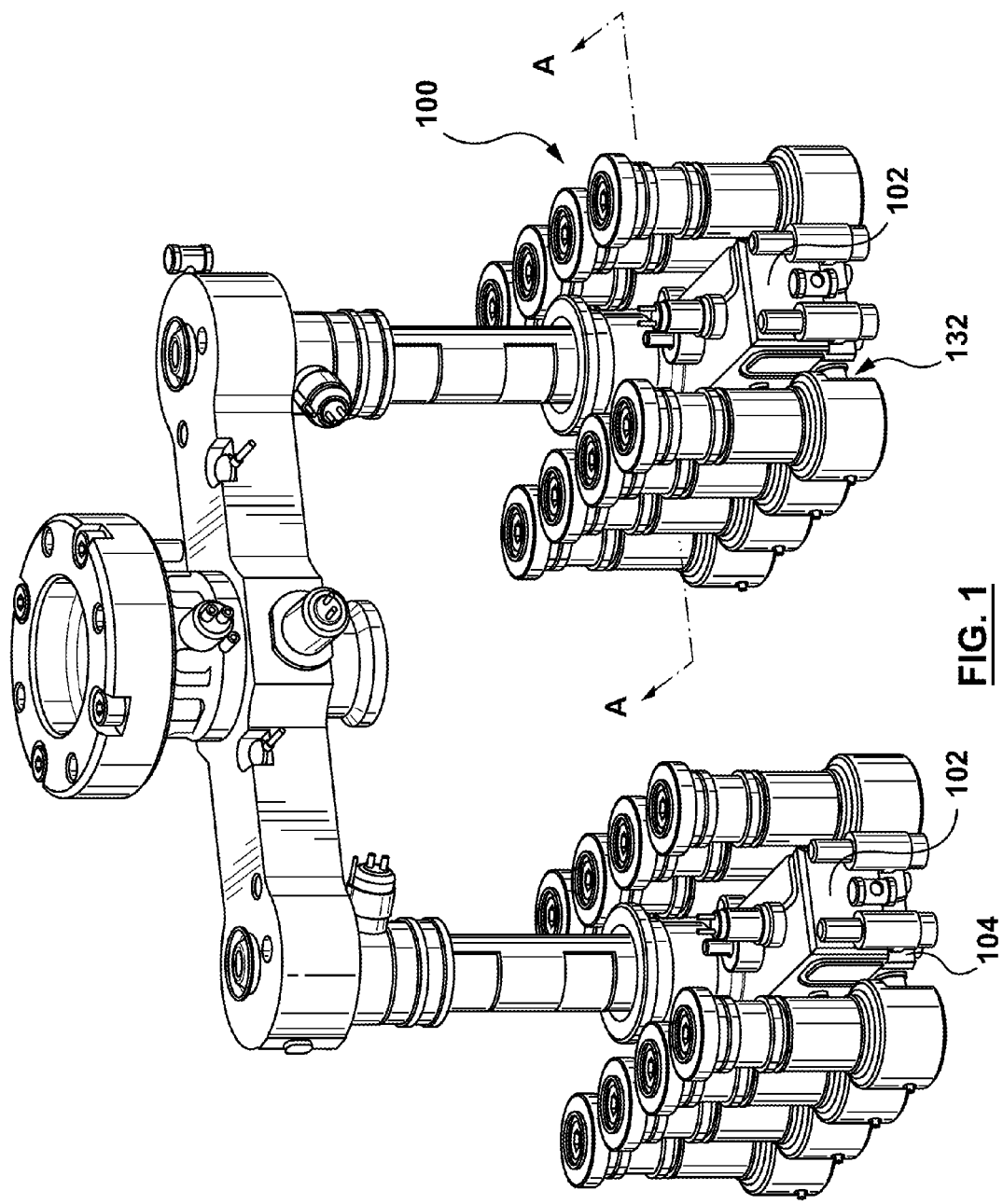
FIG. 1 is a perspective view of an edge gated hot runner system.
Figure 1A:
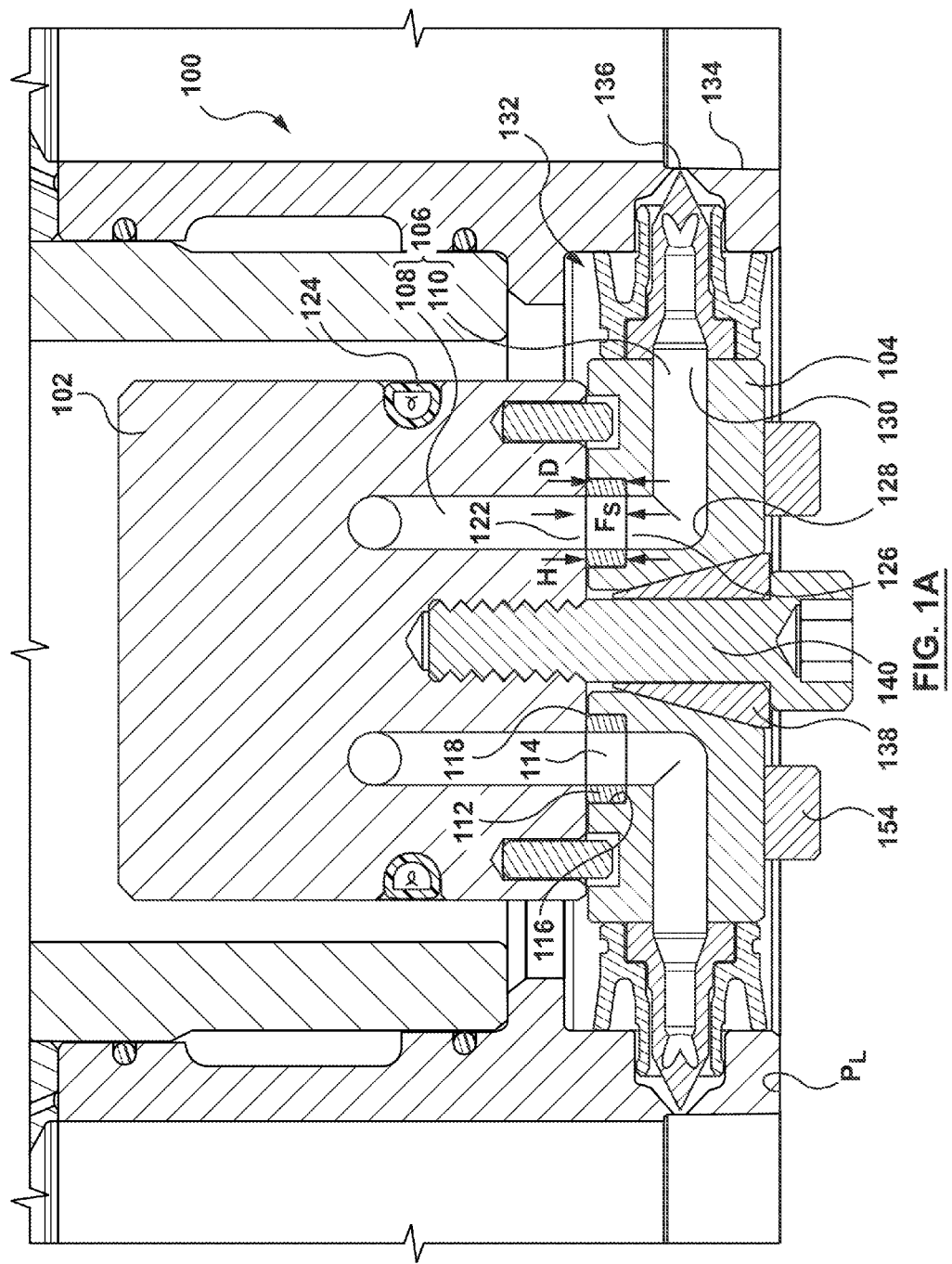
FIG. 1A is a sectional view of FIG. 1A taken along line A-A showing a sealing arrangement for a hot runner system in accordance with an embodiment hereof.

Referring now to FIG. 1, and FIG. 1A, in which FIG. 1 is a perspective view of an edge gated a hot runner system 100, and FIG. 1A is a sectional view taken along line A-A of FIG. 1 showing a hot runner sealing arrangement in accordance with an embodiment hereof. Hot runner system 100 includes inter alia a first hot runner component 102 and a second hot runner component 104. As shown in FIG. 1A, first hot runner component 102 and second hot runner component 104 include a molding material channel 106 extending therebetween. A first portion 108 of molding material channel 106 is defined by first hot runner component 102 and a second portion 110 of molding material channel 106 is defined by second hot runner component 104. A sealing component 112, having an opening 114 through which molding material channel 106 extends is positioned between first hot runner component 102 and second hot runner component 104. Sealing component 112 is partially received in a bore 116 in second hot runner component 104, such that a portion 118 of sealing component 112 projects beyond the upstream surface of second hot runner component 104. The materials selected for first hot runner component 102, second hot runner component 104, and sealing component 112, are selected such that sealing component 112 is made from a material having a hardness (HRC) that is greater than the hardness of the material from which second hot runner component 104 is made, and less than the hardness of the material from which first hot runner component 102 is made; and having a coefficient of thermal expansion (COT) that is proximate to that of second hot runner component 104. As disclosed herein, the term "proximate" should be understood to mean that the COT of the material selected for sealing component 112 and the COT of the material selected for second hot runner component 104 are within the range of +/− 20% of each other. In an embodiment, the yield point of sealing component 112 is greater than the sealing load between first hot runner component 102, sealing component 112, and second hot runner component 104 when hot runner system 100 is heated to an operating temperature of, for example, 340° C. The characteristics of the materials selected for first hot runner component 102, second hot runner component 104 and sealing component 112 as described above helps to establish a generally predictable and repeatable sealing force FS between first hot runner component 102, second hot runner component 104, and sealing component 112 regardless of the operating temperature of hot runner system 100.

The following is a list of non-limiting example materials which may be suitable for first hot runner component 102, second hot runner component 104, and sealing component 112 The material selected for first hot runner component 102 can be a hot work tool steel including, but not limited to, H13 tool steel, an example of which includes Orvar® Supreme available from Bohler-Uddeholm Corporation of Elgin, Ill., U.S.A . The material selected for second hot runner component 104 can be a copper alloy, including, but not limited to, a beryllium-free copper alloy, examples of which include AMPCOLOY® 944, available from Ampco Metal S.A. of Marly Switzerland, and MOLDSTAR® 90, available from Performance Alloys® of Germantown, Wis. U.S.A. The material selected for sealing component 112 can be a stainless steel alloy, including, but not limited to an austenitic stainless steel alloy, examples of which include PROJECT 70® 316/316 L stainless steel and BioDur® 316 LS stainless steel, both of which are available from Carpenter Technology Corporation of Wyomissing, Pa. U.S.A), and 304/304 L stainless steel, available from National Kwikmetal Service of DesPlaines, Ill. U.S.A.

The following chart illustrates non-limiting, or example material combinations, based on the example materials listed above, for first hot runner component 102, second hot runner component 104, and sealing component 112.

| | 1st Hot Runner Component | | | | 2nd Hot Runner Component | | | | Sealing Component | | |
|---|---|---|---|---|---|---|---|---|---|---|---|
| Material | COT $10^{-6}$/K | HRC | Thermal Conductivity @room temp BTU/ft hr ° F. | Material | COT $10^{-6}$/K | HRC | Thermal Conductivity @room temp BTU/ft hr ° F. | Material | COT $10^{-6}$/K | HRC | Thermal Conductivity @room temp BTU/ft hr ° F. |
| H13 Tool Steel | 12.6 | 46 | 15 | MoldStar 90 | 17.1 | 31 | 90 | 316 L/LS stainless steel | 18.5 | 39-40 | 24-31 |
| H13 Tool Steel | 12.6 | 46 | 15 | Ampco 944 | 15.7 | 31 | 90 | 304 stainless steel | 16.5 | 32-37 | 15.1 |

Testing by the applicant has shown that the sealing arrangement as disclosed herein was successful at maintaining a fluid seal between first hot runner component 102, second hot runner component 104, and sealing component 112 at up to 2000 bar of pressure when processing the molding material linear low-density polyethylene (LLDPE), which has a melt-flow Index of 130 g/10 min@192°C./2.16 KG. The hot runner component 102, second hot runner component 104, and sealing component 112 remained effective when hot runner system 100 was heated to temperatures between 200° C. to 335° C.

As shown in FIG. 1 and FIG. 1A, hot runner system 100 is configured for edge or side gating of molded articles. First hot runner component 102 has a generally cuboid body in which a plurality of first portions 108 of molding material channel 106 are defined with each first portion 108 of molding material channel 108 leading to a separate mold cavity 134. First hot runner component 102 includes an inlet (not shown) and plurality of outlets 122, with one of the plurality of first portions 108 of molding material channel 106 extending between the inlet and each of the plurality of outlets 122. First hot runner component 102 also includes a heater such as the embedded resistance wire 124 shown; however, other types of heaters are contemplated; in this manner, i.e. since first hot runner component 102 includes a heater 124, first hot runner component 102 can be considered to be actively heated. Since first hot runner component 102 is actively heated, it can be manufactured from a material that is less thermally conductive than that of second hot runner component 104, as shown in the chart above.

As shown in FIG. 1A second hot runner component 104 has a generally trapezoidal body in which second portion 110 of molding material channel is defined. The flow of molding in material channel 106 changes direction within second hot runner component 104. Specifically, molding material channel 106 exits first hot runner component 102 from a respective outlet 122 in the downstream surface thereof, passes through opening 114 in sealing component 112, and enters second hot runner component 104 in an inlet 126 in upstream surface thereof, and is then redirected through a bend 128, for example a 90 degree bend as shown in FIG. 1A, to exit second hot runner component 104 at an outlet 130 in a downstream or outward facing side surface of second hot runner component 104 before passing through a tip assembly 132 and entering a mold cavity 134 via a mold gate 136. In the embodiment shown, hot runner system 100 is a so-called side-gating or edge gating hot runner system 100 by way of example and not limitation. In the embodiment shown, hot runner system 100 includes a plurality of second hot runner components 104 arranged in opposing pairs and coupled to the downstream surface of first hot runner component 102.

In the embodiment shown, second hot runner component 104 does not contain a heater. Instead, second hot runner component 104 is heated by transfer of heat energy from first hot runner component 102 to second hot runner component 104. In this manner, i.e. since second hot runner component 104 does not include a heater or is heaterless, second hot runner component 104 can be considered to be passively heated. Accordingly, as mentioned above, the material selected for second hot runner component 104, for example, a copper alloy, is one that can generally be regarded as being more thermally conductive than that of first hot runner component 102 in order promote sufficient heating thereof.

A wedge component 138 is also coupled to the downstream surface of first hot runner component 102 by a fastener 140, and is disposed between each of the opposing pairs of opposing second hot runner components 104. Wedge component 138 and the opposing pairs of second hot runner components 104 are configured to apply an outward sealing force between the opposing pair of second hot runner components 104 and their respective tip assembly 132. A similar hot runner system is disclosed in the applicant's patent No. U.S. Pat. No. 8,932, 046 B2 which is incorporated by reference in its entirety herein.

Figure 2:
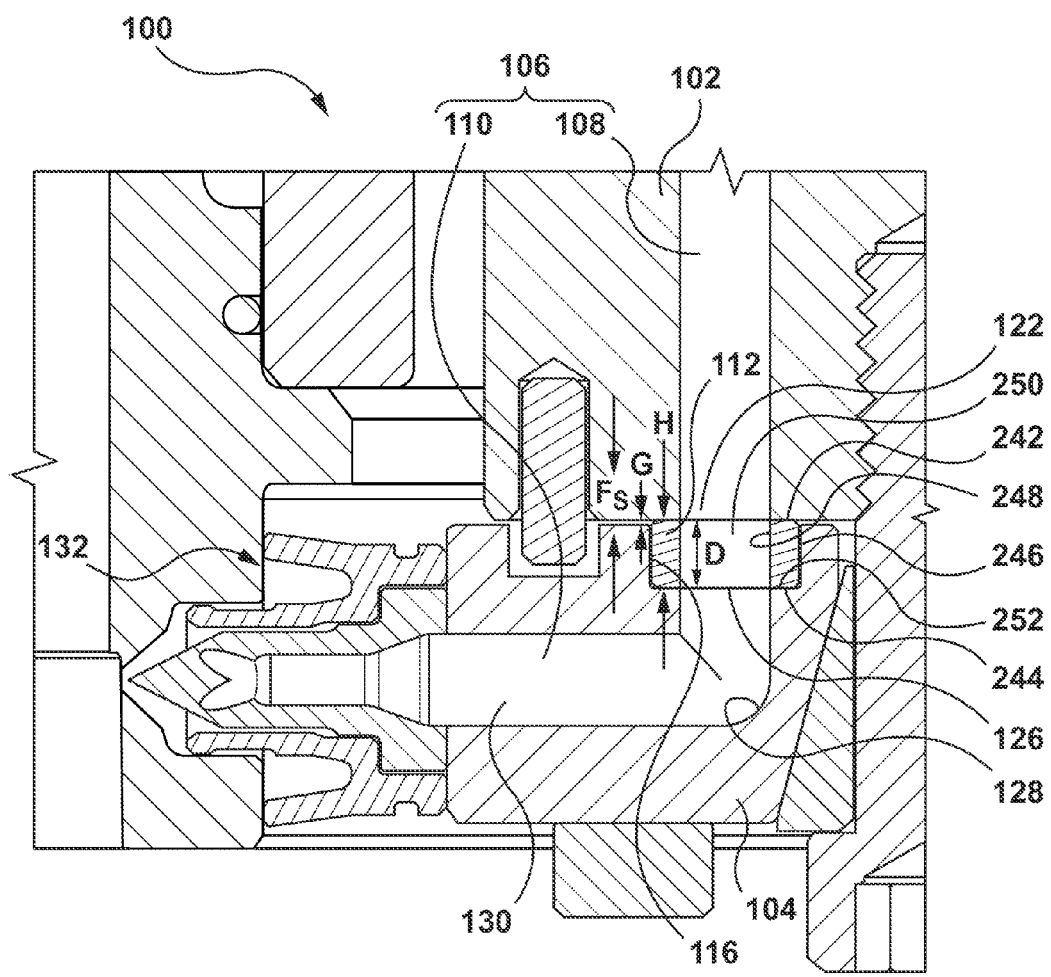
FIG. 2 is an enlarged view of a portion of FIG. 1A.

Continuing with FIG. 1A, and also referring to FIG. 2, which is an enlarged view of a portion of FIG. 1, Sealing component 112 is a generally annular shaped member having an upstream surface 242, a downstream surface 244, an outer circumferential surface 246, and an inner circumferential surface 248. Inner circumferential surface 248 of sealing component 112 defines opening 114 which is an intermediate molding material channel 250 extending between upstream surface 242 and downstream surface 244. Intermediate molding material channel 250 connects first portion 108 of molding material channel 106 and second portion 110 of molding material channel 106. When hot runner system 100 is assembled, upstream surface 242 is seated against first hot runner component 102, whereas downstream surface 244 is seated against a bottom surface 252 of bore 116 in second hot runner component 104. As shown in FIG. 2 upstream and downstream surfaces 242, 244 are generally planar and are parallel to each other. In an alternative embodiment (not shown), at least one of upstream surface 242 and downstream surface 244 is concave or convex.

Returning to FIG. 1 first hot runner component 102 and second hot runner component 104 are coupled together to create the sealing force FS between first hot runner component 102, sealing component 112, and second hot runner component 104 when hot runner system 100 is in an unheated condition. Under ideal conditions, the sealing force FS is evenly distributed across the upstream and downstream surfaces 242, 244 of sealing component 112. Coupling first hot runner component 102 and second hot runner component 104 together can be accomplished in a variety of ways, for example, by threaded fasteners 154, such as socket head cap-screws (partially shown), extending between second hot runner component 104 and first hot runner component 102 or a combination of threaded fasteners 154 and force created by wedge component 138. To help maintain an even sealing force FS between first hot runner component 102, second hot runner component 104, and sealing component 112, fasteners 154 are evenly spaced around sealing component 112. Since the coefficient of thermal expansion of sealing component 112 is proximate to that of second hot runner component 104, as hot runner system 100 is heated to an operating condition, the depth D of bore 116 in second hot runner component 104 increases, and the height of the portion of sealing component 112 within bore 116 increases by substantially the same amount as the depth D of bore 116, and the net result being that the sealing force FS between first hot runner component 102, sealing component 112, and second hot runner component 104 remains generally constant as hot runner system 100 is heated to an operating condition. In the present application, the term "generally constant" as it refers to the sealing force FS means no more than a 20% difference. Although a portion of sealing component 112 projects beyond the upstream surface of second hot runner component 104, the amount of growth or thermal expansion of this portion is a fraction of the amount of growth or thermal expansion of the portion of sealing component 112 that is within bore 116. Accordingly, the increase the sealing force FS between first hot runner component 102, sealing component 112, and second hot runner component 104 created by the portion of sealing component 112 that projects beyond second hot runner component can be considered marginal.

In an embodiment, at least 75% of the overall height H of sealing component 112 is received in the bore 116 in second hot runner component 104; however, in other embodiments at least 95% or even at least 99% of the overall height H of sealing component 112 is received in the bore 116 in second hot runner component 104. Since second hot runner component 104 is passively heated, i.e. by transfer of heat from first hot runner component 102, the amount of sealing component 112 that projects beyond second hot runner component 104 is selected so as to not impede sufficient heat transfer from first hot runner component 102 to second hot runner component 104. For example, the depth D of bore 116 and the height H of sealing component 112 can be sized such that sealing component 112 projects beyond second hot runner component 104 to create a gap G between first hot runner component 102 and second hot runner component 104. For example, sealing component 112 can project from second hot runner component by about 0.005 mm to about 0.1 mm which separates first hot runner component 102 and second hot runner component 104 by a gap G which is about 0.005 mm to about 0.1 mm. A gap G of this magnitude, i.e. between about 0.005 mm and about 0.1 mm permits sufficient heat transfer between first hot runner component 102 and second hot runner component 104, and also ensures that the thermal expansion of the portion of sealing component 112 that projects beyond the upstream surface of second hot runner component 104 can be considered marginal or negligible. It is contemplated that the gap G could be less than about 0.005 mm, so long as in operation the upstream surface of sealing component projects beyond the upstream surface of second hot runner component 104.

The diameter of bore 116 in second hot runner component 104 and the diameter of outer circumferential surface 246 of sealing component 112 are sized to create a removable "slip-fit" therebetween. In an alternative embodiment the diameter of bore 116 in second hot runner component 104 and the diameter of outer circumferential surface 246 of sealing component 112 are sized to create an "interference-fit" therebetween, such that bore 116 can increase the hoop-strength of sealing component 112 and can support sealing component 112 against the injection pressure created by the flow of molding material through intermediate molding material channel 250.

Figure 3:
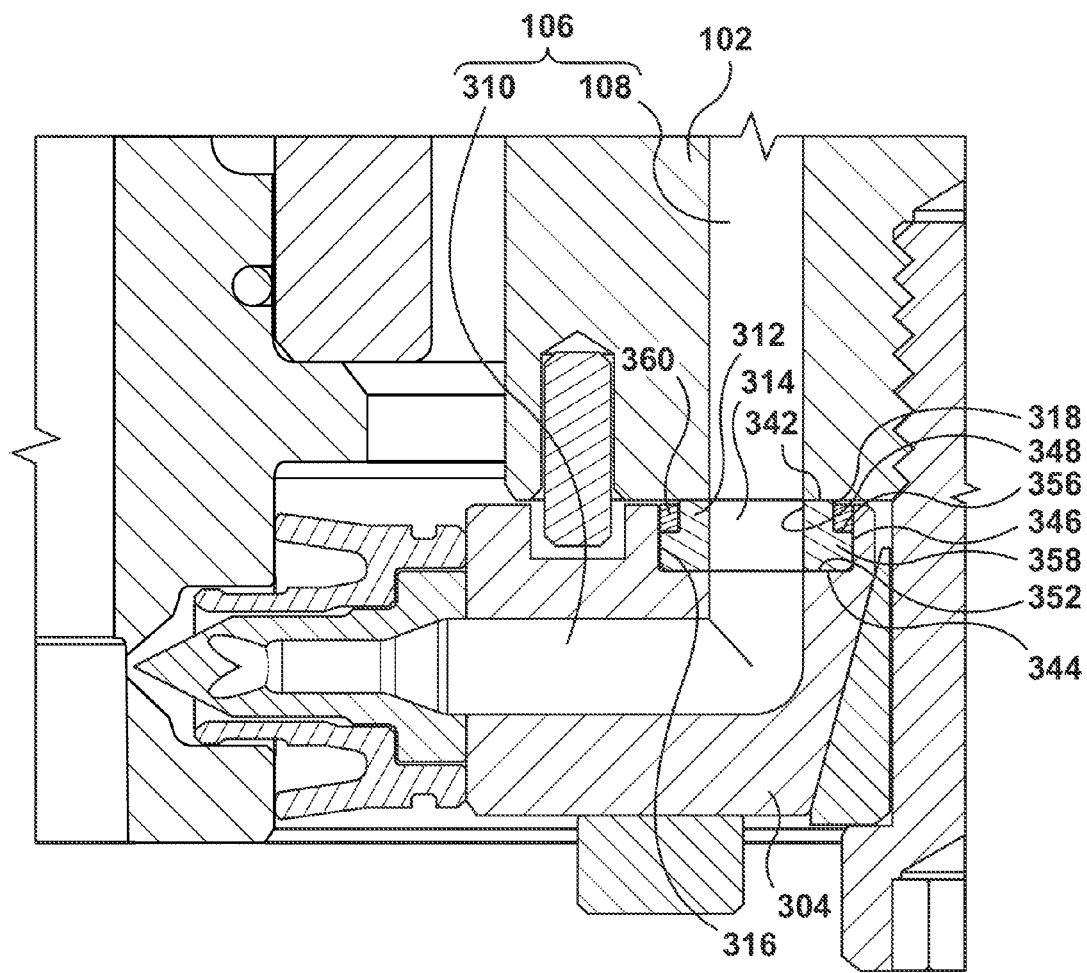
FIG. 3 is an enlarged view of a portion of FIG. 1A with a sealing arrangement for a hot runner system in accordance with another embodiment hereof.

FIG. 3 is an enlarged view of a portion of FIG. 1A having sealing arrangement for a hot runner system in accordance with another embodiment hereof. Features and aspects of the other embodiments may be used accordingly with the current embodiment.

A sealing component 312, having an opening 314 through which molding material channel 106 extends is positioned between first hot runner component 102 and a second hot runner component 304. Sealing component 312 is partially received in a bore 316 in second hot runner component 304, such that a portion 318 of sealing component 312 projects beyond the upstream surface of second hot runner component 304. The materials selected for first hot runner component 102, second hot runner component 304, and sealing component 312, are selected such that sealing component 312 is made from a material having a hardness (HRC) that is greater than the hardness of the material from which second hot runner component 304 is made, and less than the hardness of the material from which first hot runner component 102 is made; and having a coefficient of thermal expansion (COT) that is proximate to that of second hot runner component 304.

Sealing component 312 has an upstream surface 342, a downstream surface 344, an outer circumferential surface 346, and an inner circumferential surface 348. When hot runner system 100 is assembled, upstream surface 342 is seated against first hot runner component 102, whereas downstream surface 344 is seated against a bottom surface 352 of bore 316 in second hot runner component 304. As shown in FIG. 3, outer circumferential surface 346 include a step 356 which increases the diameter of a portion 358 of sealing component 312, which defines downstream surface 344 in comparison to portion 318 of sealing component 312 that projects beyond second hot runner component 304 and defines upstream surface 342. Step 356 in outer circumferential surface 346 gives sealing component 312 a cross sectional shape that can be considered to have an inverted "T" shape.

To accommodate the larger diameter portion 358 of sealing component 312, the diameter of bore 316 has been increased in comparison to that of bore 116, shown in FIG. 1A. The increased diameter portion 358 of sealing component 312 and the increased diameter of bore 316 create a larger load bearing area between downstream surface 344 (of sealing component 312) and bottom surface 352 (of bore 116) than the load bearing area between upstream surface 352 (of sealing component) and first hot runner component 102. Since sealing component 112 is made from a material having a hardness that is greater than the hardness of the material from which second hot runner component 304 is made, the increased load bearing area between downstream surface 344 (of sealing component 312) and bottom surface 352 (of bore 316) may reduce the likelihood of sealing component 312 hobbing into second hot runner component 304 in applications where high sealing forces may be required between first hot runner component 102 and second hot runner component. An example of such an application includes molding of engineering resins, such as, for example, polysulfone (PES).

Continuing with FIG. 3, sealing component can include a collar 360 which surrounds sealing component 312 upstream from step 356. As shown in FIG. 3 a gap is present between collar 360 and first hot runner component. Collar 360 can be made from a thermally conductive material, which can be the same or different than that of second hot runner component, so as to promote heat transfer between second hot runner component 304 and sealing component 312.

As shown herein, the sealing arrangement between a first hot runner component and a second hot runner component is implemented within the context of a hot runner system 100 which is configured as a side-gate or edge gate hot runner system by way of example and not limitation. It should be appreciated that the sealing arrangement described herein could be implemented in a variety of hot runner scenarios in order to create a seal between the molding material channels of adjacent first and second hot runner components which are made from materials having dissimilar properties, i.e. as discuss having regard to the properties of the example materials described above. For example, first hot runner component could be a hot runner manifold having a heater, second hot runner component could be an unheated hot runner nozzle that is in fluid communication between the manifold and a mold gate.

As described herein the hot runner sealing arrangement is configured such that first hot runner component 102 is upstream from second hot runner component 104 by way of example and not limitation. However, it should be appreciated that the hot runner sealing arrangement described herein could be used in a hot runner system that is configured such that a second hot runner component having a sealing component received therein, is upstream from a first hot runner component. For example, second hot runner component 104 could be an unheated inlet component that is positioned upstream from a first hot runner component in the form of a heated manifold. It will be apparent to persons skilled in the relevant art that various changes in form and detail can be made therein without departing from the scope of the present disclosure. Thus, the breadth and scope of the present disclosure should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment.

What is claimed is:

1. A hot runner assembly comprising:
a first hot runner component and a second hot runner component having a molding material channel extending therebetween; and
a sealing component positioned between the first hot runner component and the second hot runner component, and having an opening through which the molding material channel extends,
wherein the sealing component is received in a bore in the second hot runner component such that a portion of the sealing component projects beyond the second hot runner component to create a gap between the first hot runner component and the second hot runner component,
wherein the sealing component has a hardness that is greater than a hardness of the second hot runner component and less than a hardness of the first hot runner component, and
wherein the sealing component has a coefficient of thermal expansion that is proximate to a coefficient of thermal expansion of the second hot runner component.

2. The hot runner assembly according to claim 1, wherein the first hot runner component and the second hot runner component are coupled together to create a sealing load between the first hot runner component, the sealing component, and the second hot runner component when the hot runner assembly is in an unheated condition.

3. The hot runner assembly according to claim 2, wherein the sealing load between the first hot runner component, the sealing component, and the second hot runner component remains generally constant as the hot runner assembly is heated to an operating condition.

4. The hot runner assembly according to claim 2, wherein the sealing load between the first hot runner component, the sealing component, and the second hot runner component is less than the yield point of the sealing component when the hot runner assembly is heated to an operating temperature.

5. The hot runner assembly according to claim 1, wherein the first hot runner component is actively heated.

6. The hot runner assembly according to claim 5, wherein the second hot runner component is passively heated.

7. The hot runner assembly according to claim 1, wherein the sealing component defines a portion of the molding material channel.

8. The hot runner assembly according to claim 1, wherein sealing component has a planar upstream surface.

9. The hot runner assembly according to claim 8, wherein sealing component has a planar downstream surface.

10. The hot runner assembly according to claim 9, wherein the planar upstream surface and the planar downstream surface are parallel.

11. The hot runner assembly according to claim 1, wherein the second component is made from a copper alloy.

12. The hot runner assembly according to claim 11, wherein the copper alloy is a beryllium-free copper alloy.

13. The hot runner assembly according to claim 1, wherein the first hot runner component is made from a hot work tool steel.

14. The hot runner assembly according to claim 1, wherein the sealing component is made from a stainless steel alloy.

15. The hot runner assembly according to claim 14, wherein the stainless steel alloy is an austenitic stainless steel alloy.

16. The hot runner assembly according to claim 14, wherein the stainless steel alloy is a low carbon, high nickel and molybdenum stainless steel alloy.

17. The hot runner assembly according to claim 1, wherein the surface area of a downstream surface of the sealing component is greater than the surface area of an upstream surface of the sealing component.

18. The hot runner assembly according to claim 1, wherein the bore in the second hot runner and the sealing component are sized to increase the hoop strength of the sealing component.

19. The hot runner assembly according to claim 1, wherein at least 75% of the height of the sealing component is received in the bore in the second hot runner component.

20. A hot runner assembly comprising:
a first hot runner component having a first portion of a molding material channel, wherein the first hot runner component is actively heated;
a second hot runner component having a bore and a second portion of the molding material channel in communication with the first portion, wherein the second hot runner component is passively heated; and
a sealing component positioned in the bore and positioned between the first hot runner component and the second hot runner component, and having an opening through which the molding material channel extends,
wherein the sealing component has a hardness that is greater than a hardness of the second hot runner component and less than a hardness of the first hot runner component, and
wherein the sealing component has a coefficient of thermal expansion that is proximate to a coefficient of thermal expansion of the second hot runner component.

21. A hot runner assembly comprising:
a first hot runner component having a first portion of a molding material channel, wherein the first hot runner component is actively heated;
a second hot runner component having a bore and a second portion of the molding material channel in communication with the first portion, wherein the second hot runner component is passively heated; and
a sealing component positioned in the bore and positioned between the first hot runner component and the second hot runner component, and having an opening through which the molding material channel extends,
wherein the second hot runner component has a thermal conductivity that is greater than a thermal conductivity of the first hot runner component, and
wherein the sealing component has a coefficient of thermal expansion that is proximate to a coefficient of thermal expansion of the second hot runner component.

* * * * *